United States Patent [19]
Liechty

[11] 4,454,642
[45] Jun. 19, 1984

[54] APPARATUS FOR COMPRESSING A RETAINER RING TO ASSEMBLY SIZE AND RETAINER RING COMPRESSED THEREBY

[75] Inventor: Deryll Liechty, Berne, Ind.

[73] Assignee: Ex-Cell-O Corporation, Troy, Mich.

[21] Appl. No.: 362,203

[22] Filed: Mar. 26, 1982

[51] Int. Cl.³ .......................................... B23P 19/04
[52] U.S. Cl. ....................................... 29/229; 29/235
[58] Field of Search ................. 29/229, 235, 243.56, 29/225

[56] References Cited

U.S. PATENT DOCUMENTS

| | | | | |
|---|---|---|---|---|
| 2,840,892 | 7/1958 | Erdmann | ........................... | 29/229 X |
| 2,870,529 | 1/1959 | Erdmann | ........................... | 29/229 |
| 3,134,168 | 5/1964 | Erdmann | ........................... | 29/229 X |

Primary Examiner—Frederick R. Schmidt
Assistant Examiner—Steven P. Schad

Attorney, Agent, or Firm—Edward J. Timmer

[57] ABSTRACT

An apparatus for compressing a retainer ring to reduced assembly size and maintaining the compressed assembly size at an assembly location by internal containment of the retaining ring lugs is provided. The apparatus typically includes a compressing member for compressing the ring from the exterior and mandrel member disposed in the compressing member and around which the ring is compressed to assembly size. The mandrel member includes a lug-retaining groove into which retainer ring lugs having special flats are compressed and retained interiorly of the ring to hold the ring at reduced assembly size. The compressed retainer ring is carried to the assembly location outside the compressing member on the mandrel member and is stripped from the mandrel member for final assembly internally in a part.

15 Claims, 12 Drawing Figures

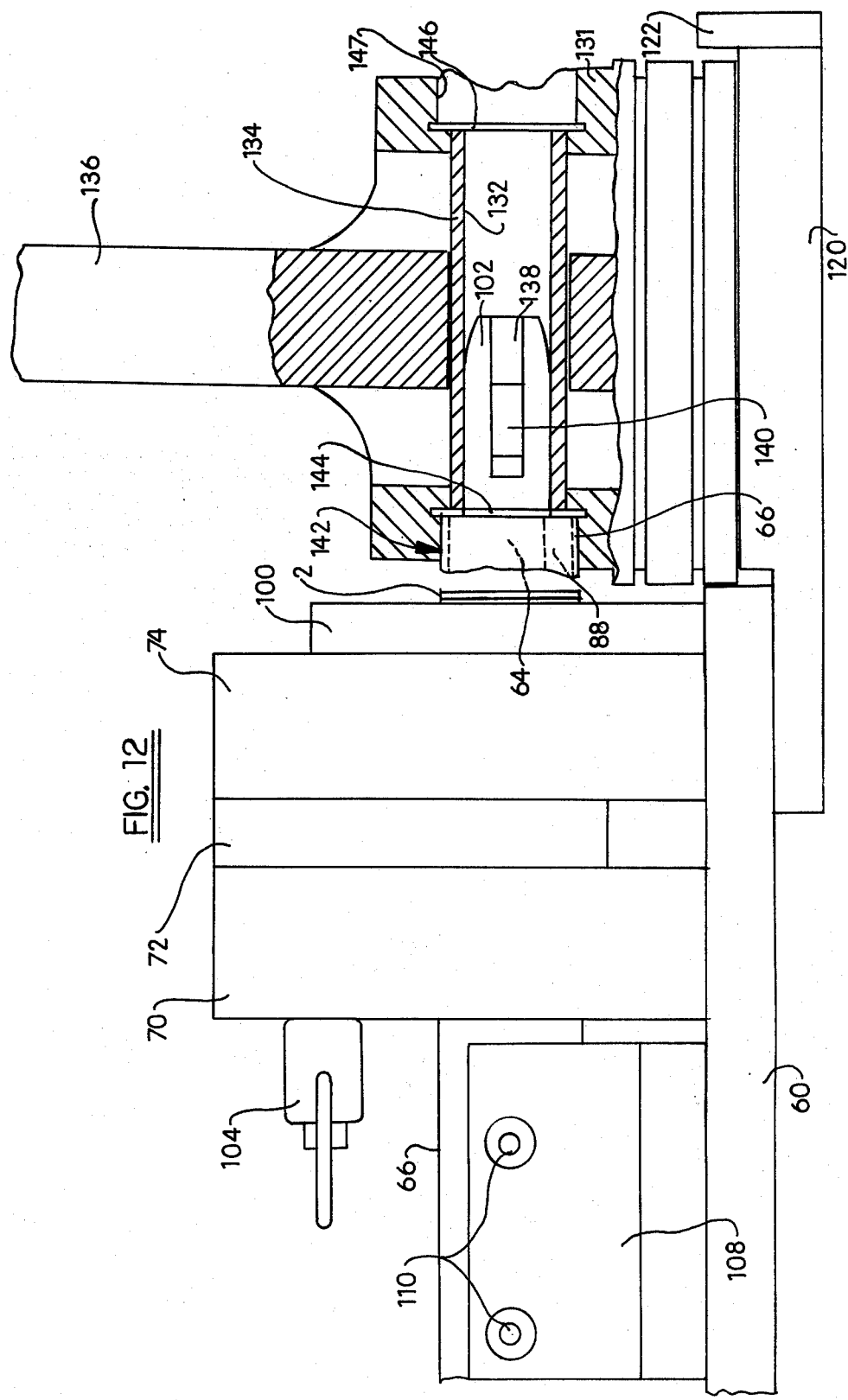

APPARATUS FOR COMPRESSING A RETAINER RING TO ASSEMBLY SIZE AND RETAINER RING COMPRESSED THEREBY

FIELD OF THE INVENTION

The present invention relates to an apparatus for compressing a retainer ring and, in particular, to an apparatus for compressing a retainer ring to size for assembly and maintaining the compressed ring size by means internal of the ring, whereby the external portion of the ring is unobstructed for ease of final assembly with other components at an assembly location. A novel retainer ring is also described for use with the apparatus.

BACKGROUND OF THE INVENTION

Resilient retainer rings having spaced apart lugs are widely used in the assembly of articles of manufacture to hold various components thereof together. For example, the wrist pin joining the piston and connecting rod of an internal combustion engine is held in the piston bore by an internal retainer ring inserted into grooves in opposite pilot sections of the piston bore. Retainer rings having a flat side profile and shape shown in FIG. 11 have in the past been used in holding the wrist pin in the piston bore of automobile diesel engines. Various attempts have been made by prior art workers to devise automated or semi-automated apparatus for compressing these flat retainer rings and maintaining the ring at the compressed assembly size for insertion in the piston bore. These apparatus have generally utilized an external containment system such as a thin tapered sleeve positioned around the compressed ring to maintain the compressed condition at the assembly location. However, the use of such thin external containment sleeves has been disadvantageous as a result of the vulnerability of the sleeves to wear by friction contact with the ring and also as a result of the requirement for additional clearance space necessary to enable insertion of the retainer ring and external sleeve in the piston bore.

Due to the inadequacies in existing ring compressing apparatus, flat profile retainer rings are still assembled in the bore of certain engines by hand using plier type tools with probe pins to engage the small hole provided in each lug of the retainer rings. Of course, assembly in this manner is more time consuming than assembly by automated or semi-automated means and also is more inconsistent in terms of the achievement of uniform compression of the retainer rings and accurate placement in the piston bore.

Thus, what is still needed is an apparatus, preferably amenable to automatic or semi-automatic operation, for compressing such retainer rings to assembly size and maintaining the compressed ring size with the external ring periphery fully exposed for insertion into the piston bore or other part internal bore.

SUMMARY OF THE INVENTION

The present invention has as an object the provision of such an apparatus which includes as an important feature internal containment means for holding a retainer ring at the compressed size for assembly and which overcomes the aforementioned disadvantages of prior art external containment means or manual plier-type ring compressing tools.

In a typical embodiment, the apparatus of the present invention includes a compressing means for compressing the retainer ring preferably from the exterior and mandrel means disposed in the compressing means and around which the ring is compressed to assembly size. The mandrel means is configured to maintain the desired compressed ring shape and, importantly, also is provided with the lug-retaining means into which the retainer ring lugs are compressed and retained interiorly of the ring to hold the ring at the compressed assembly size. The mandrel means preferably includes a portion extending outside the compressing means to an assembly location. The retainer ring is carried on the mandrel means to the assembly location outside the compressing means with the exterior of the ring unobstructed or fully exposed to facilitate the assembly process, e.g., insertion in a pilot or other internal part bore. Final assembly is effected by stripping the compressed ring from the mandrel means at the assembly location and to this end the mandrel means preferably includes a ring expansion portion where the lug retaining means terminates to free the retainer lugs.

In one preferred embodiment, the ring compressing means includes a bore of gradually decreasing cross-section extending therethrough. The mandrel means is disposed in the bore and the retainer ring is received in the bore straddling the mandrel means. The apparatus also preferably includes means for moving the retainer ring through the bore in the direction of decreasing bore cross-section so that the ring is compressed on the mandrel means with the lugs received and retained in the lug-retaining means. As the ring moves through the bore, the ring moving means may also constitute the means for stripping the compressed ring from the mandrel means at the assembly location by moving the ring to the expansion portion of the mandrel means.

In a particularly preferred embodiment, the retainer ring is pushed through an inwardly tapered bore of the compressing means by tubular pusher means and the ring lugs are received and retained in a keyway or slot extending along the mandrel means to the expansion portion thereof.

In yet another preferred embodiment, a loading means is associated with the apparatus and includes a feed rail means on which a plurality of stacked retainer rings is carried, injector means for separating an individual retainer ring from the stack and conveying it to the ring compressing means and guide means extending to the compressing means for guiding the individual ring onto the mandrel means as the ring is conveyed by the injector means.

In a particularly preferred embodiment, the mandrel means includes a guide portion in front of the compressing means configured to receive a retainer ring from the injector means and guide the ring into proper orientation with respect to the lug-retaining means so that the lugs are compressed and retained in the lug-retaining means when the ring is compressed.

A novel retainer ring is disclosed and is configured especially for use with the aforementioned apparatus. In a typical working embodiment, the retainer ring includes a pair of lugs which are spaced apart from one another in the uncompressed condition and which have flats facing away from one another in a first predetermined angular relationship such that the flats become aligned in a second retainable angular relationship, preferably parallel, when the ring is compressed on the mandrel of the aforesaid apparatus with the lugs touching. The second retainable orientation is important for the retention of the lugs in the mandrel keyway prior to assembly.

Further features as well as other objects and advantages of the present invention will be apparent by reference to the following detailed description taken with the accompanying drawings described herebelow.

BRIEF DESCRIPTION OF THE DRAWINGS

FIG. 12 is a side elevation of a preferred ring compression assembly having an assembly table on which a piston, wrist pin and connecting rod (shown in partial section) are assembled.

DESCRIPTION OF PREFERRED EMBODIMENTS

Figure 9:
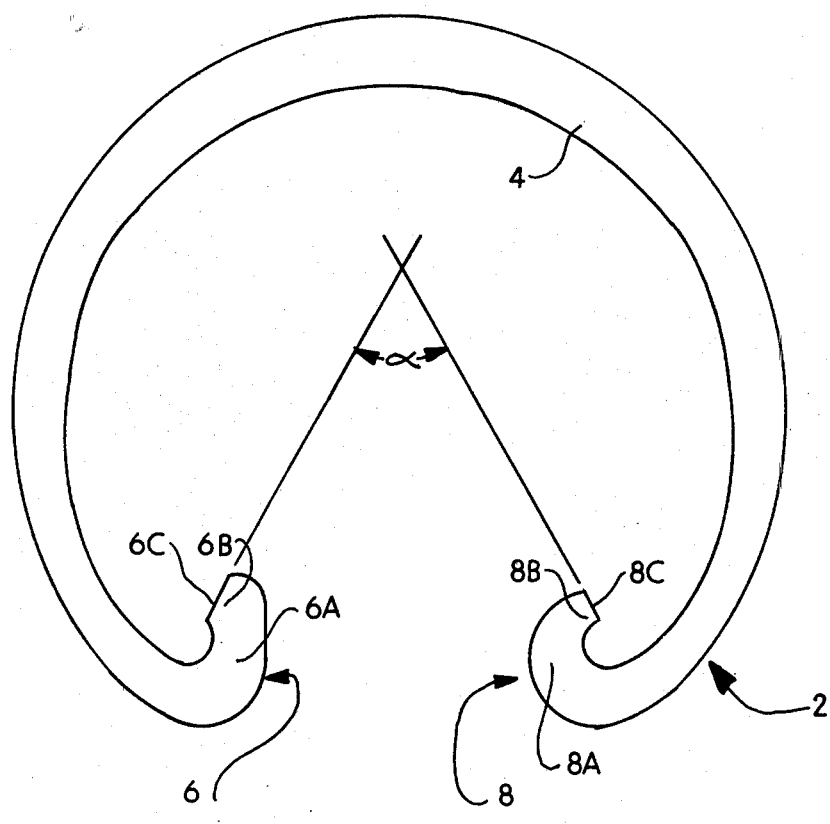
FIG. 9 is a plan view of a preferred retainer ring.
Figure 10:
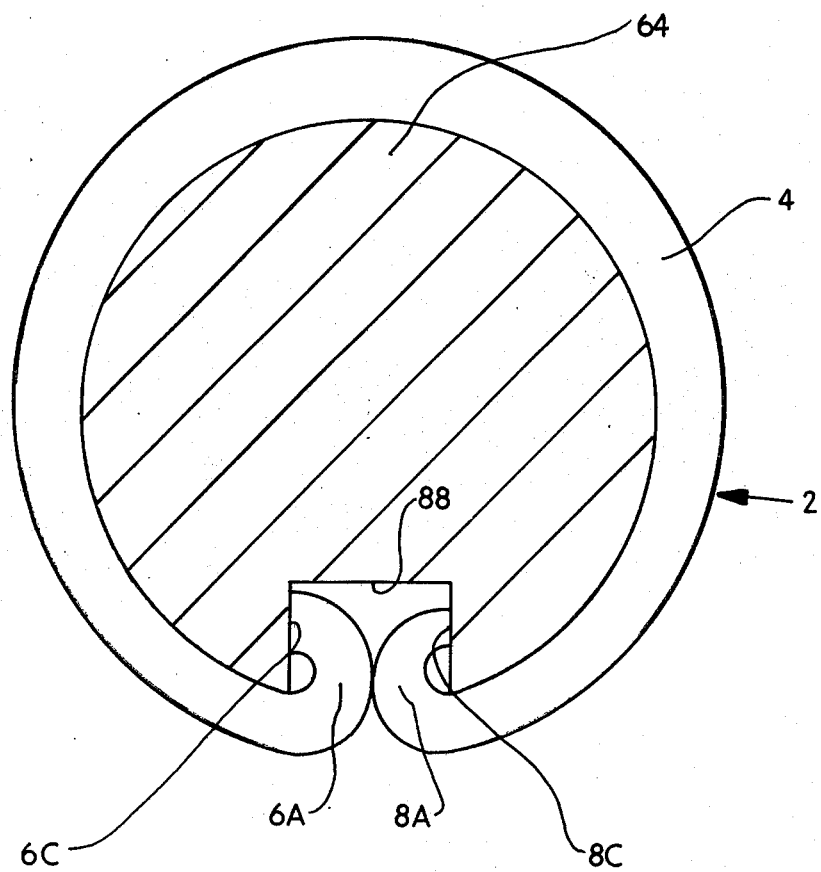
FIG. 10 is an enlarged sectional view of the mandrel with a compressed retainer ring held thereon.
Figure 11:
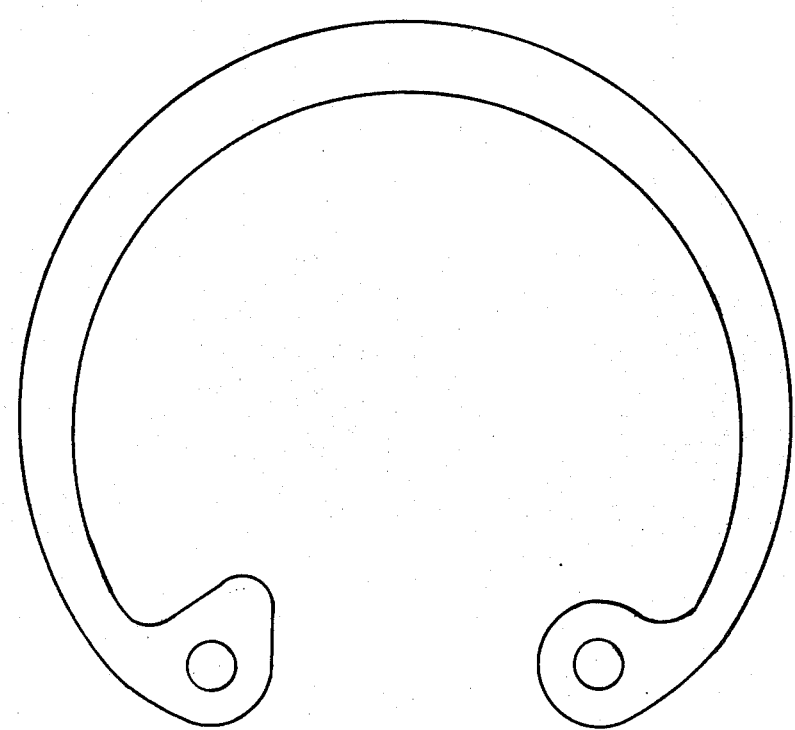
FIG. 11 is a plan view of a prior art retainer ring.

FIGS. 1-8 illustrate a preferred apparatus constructed according to the present invention for compressing the retainer ring shown in FIG. 9 to assembly size and holding the ring at assembly size at an assembly location. The particular retainer ring 2 shown in FIG. 9 is designed for use in the assembly of a piston, connecting rod and wrist pin (see FIG. 12) for a conventional automobile diesel engine. The retainer ring 2 includes a C-shaped portion 4 having a circular outer profile in plan and a non-circular inner profile in plan when in the uncompressed condition shown in the figure. The ends of the C-shaped portion terminate in lugs 6 and 8 which are spaced apart in the uncompressed ring condition. The lugs include first portions 6a and 8a extending inwardly into the ring when viewed in plan and second portions 6b and 8b directed back upon themselves in generally opposite directions as shown with the directed-back portions terminating in flats 6c and 8c facing away from one another. Typically, the ring is flat when viewed in elevation. An important feature of the retainer ring 2 is that the flats 6c and 8c are oriented in a certain predetermined angular relationship in the uncompressed condition, in particular planes coincident with flats 6c,8c are selected to intersect at an included angle α (alpha) which insures that flats 6c,8c are in substantially parallel relationship when the retainer ring is compressed to assembly size with the inwardly extending lug portions 6a,8a touching (FIG. 10). An alpha angle of 80° has been used to provide parallel flats with the lugs touching. As will be explained in more detail hereinafter, flats 6c,8c in prescribed angular relation facilitate holding of the retainer ring at the compressed assembly size for final assembly.

Of course, the retainer ring may be provided with different configurations, dimensions, alpha angle and the like depending upon the intended application. Typically, the ring is made from heat treated SAE 1060-1090 steel.

Figure 1:
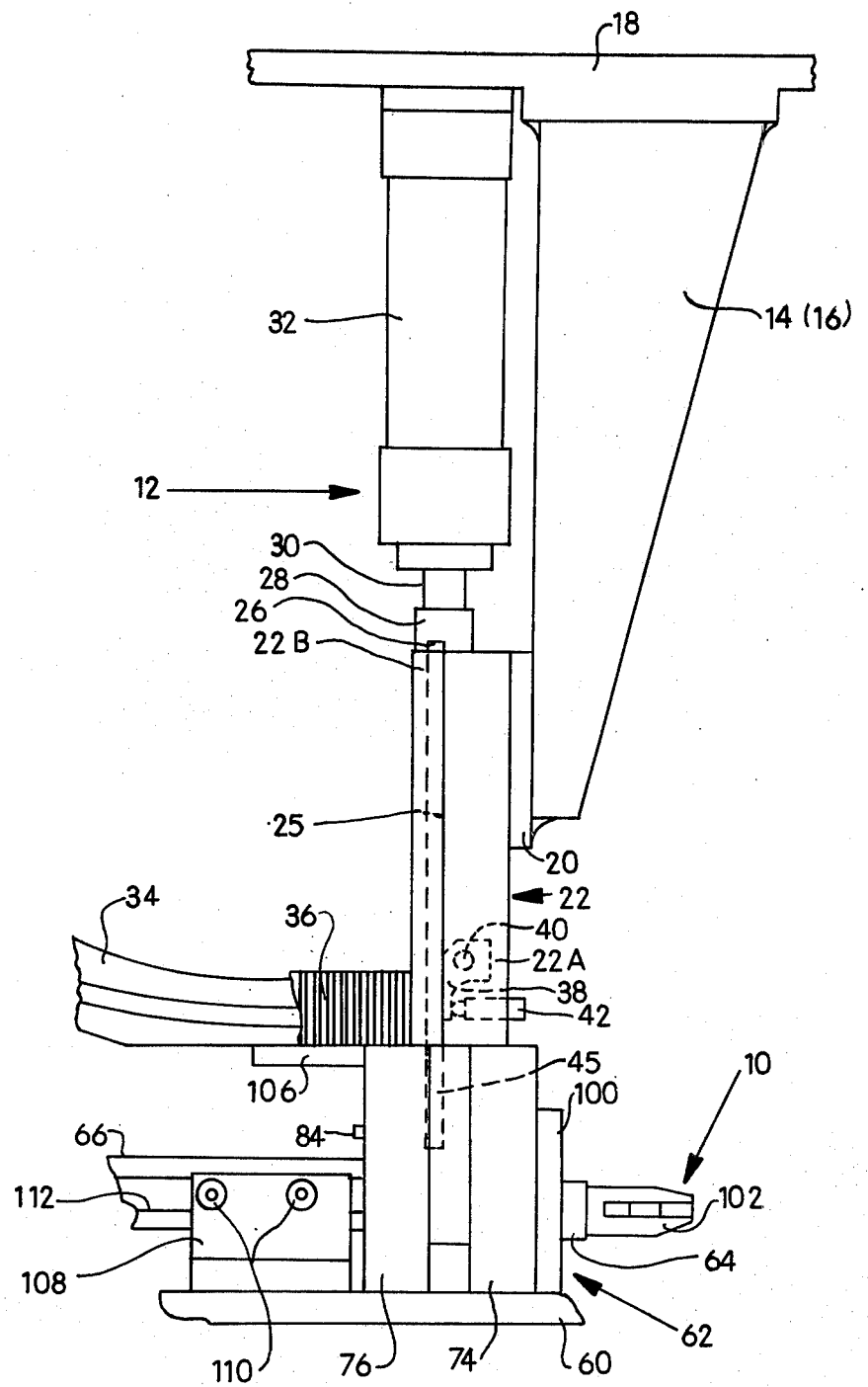
FIG. 1 is a partial side elevation of a preferred apparatus of the invention.
Figure 2:
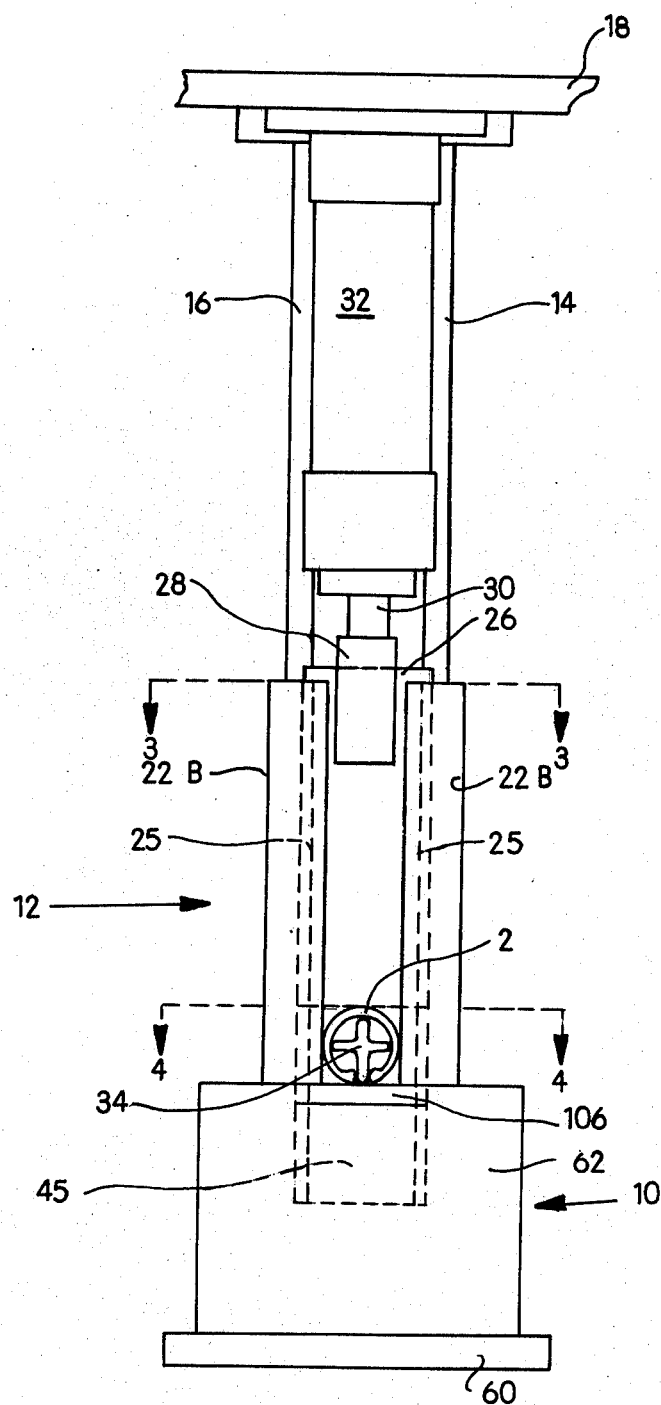
FIG. 2 is a side elevation taken 90° from that of the preceding figure.
Figure 3:
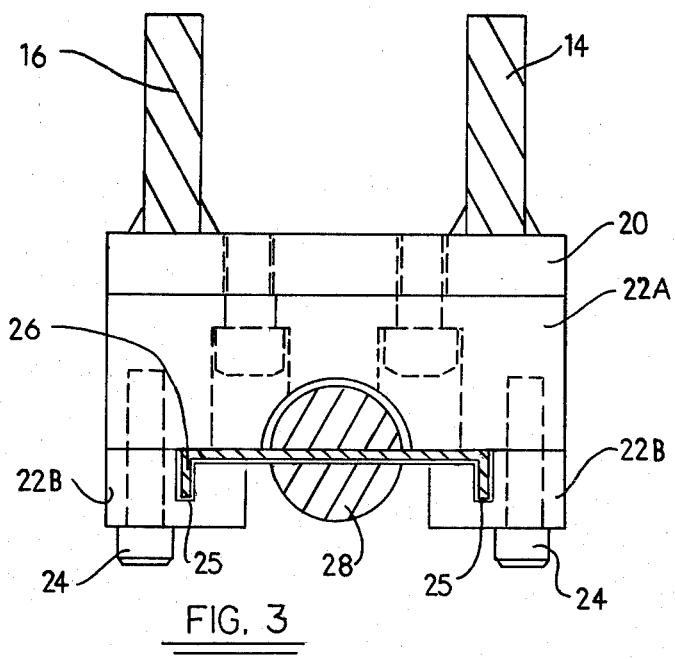
FIG. 3 is a sectional view along line 3—3 of FIG. 2.
Figure 4:
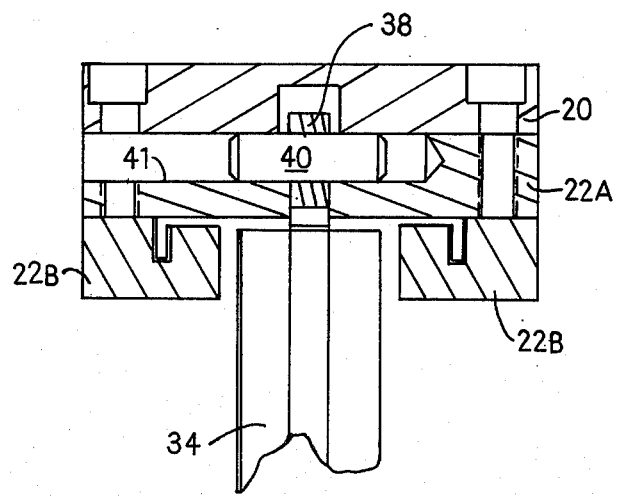
FIG. 4 is a sectional view along line 4—4 of FIG. 2.

As shown in FIGS. 1 and 2, the apparatus of the invention in broad terms inclues a ring compressing means 10 for compressing and holding the retainer ring of FIG. 9 at assembly size and preferably also for supplying the compressed ring to an assembly location for joining of other components such as the diesel piston, wrist pin and connecting rod and loading means 12 for delivering an uncompressed retainer ring to the ring compressing means 10 with the ring oriented in predetermined fashion for compression to assembly size.

The loading means 12 comprises a pair of vertical, spaced support plates 14,16 of triangular shape welded or otherwise attached at the upper end to horizontal frame member 18 and similarly attached at its lower end to vertical frame member 20. Vertical frame 20 in turn is attached to a retainer ring injector guide 22 comprising a vertical guide block 22a and a pair of spaced apart vertical guide rails 22b fastened to guide block 22a by bolts 24, FIG. 3. It is apparent that guide block 22a and guide rails 22b together define a pair of L-shaped guide slots 25 along their vertical lengths. It is also apparent that a U-shaped injector plate 26 is disposed in the guide slots 25 for up and down reciprocating movement therein for purposes to be described hereinbelow. Injector plate 26 is fastened to support rod 28 which in turn is connected to the shaft 30 of hydraulic cylinder 32 mounted on horizontal frame member 18. Cylinder 32 is of course actuated to move injector plate 26 up and down in guide slots 25.

The loading means 12 is provided with a retainer ring feed rail 34 having a cross-section shown in FIG. 2 on which a stack 36 of uncompressed retainer rings is fed to the injector plate 26 with the retainer ring lugs 6,8 oriented in the downward direction relative to FIG. 2. The stack 36 of retainer rings is typically comprised of 1200 rings; of course, other numbers of rings can be provided. As shown best in FIG. 4, the retainer ring feed rail 34 terminates in the space between guide rails 22b short of and facing a first guide lever 38 which is pivotably mounted in guide block 22a by pivot shaft 40 in passage 41.

Figure 7:
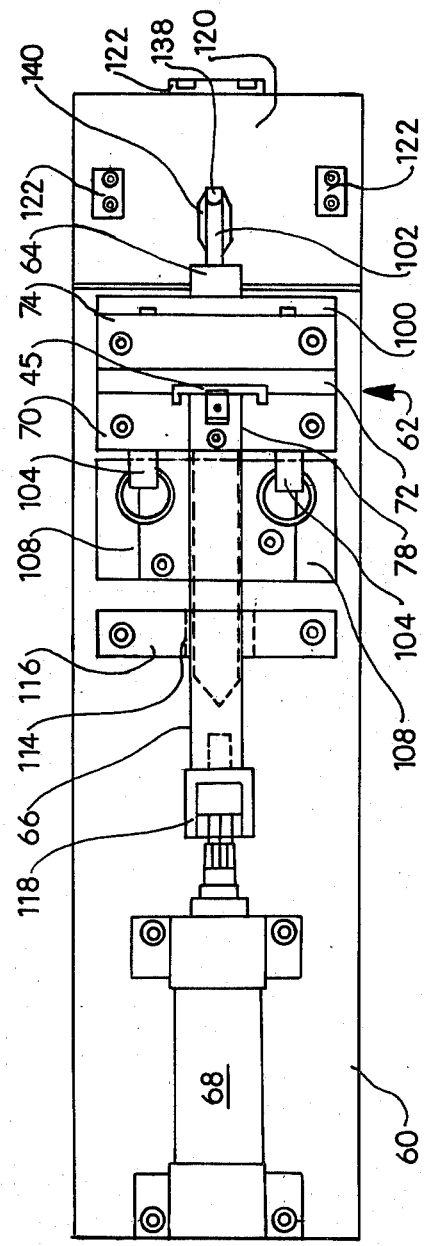
FIG. 7 is a top elevation of the ring compression assembly.
Figure 8:
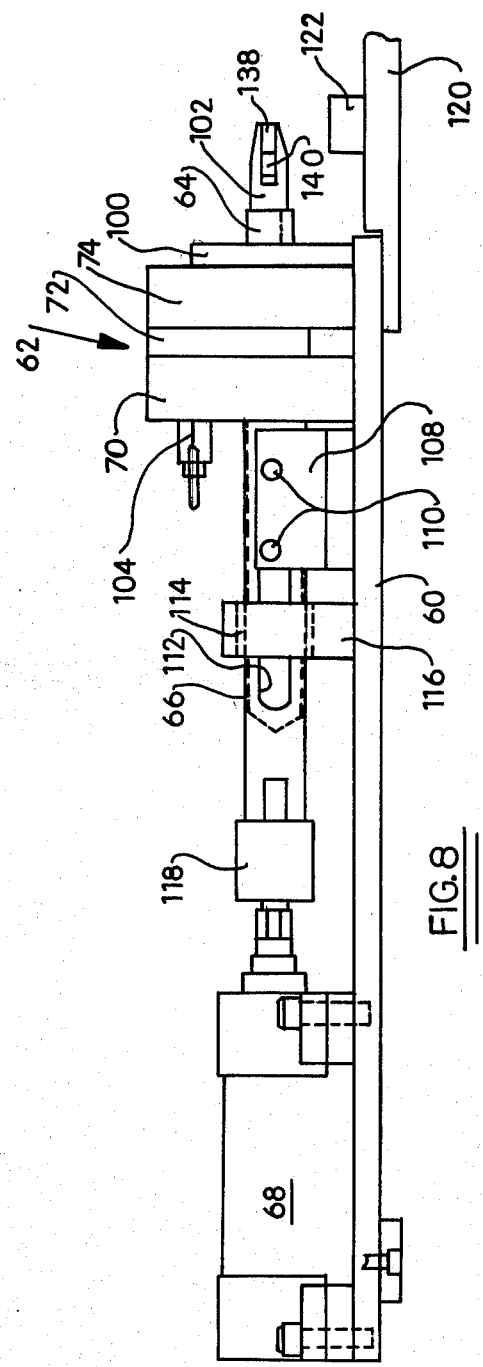
FIG. 8 is a side elevation of the ring compression assembly.

As the stack of retainer rings descends down the feed rail 34, it eventually abuts the lever 38 which is biased outwardly toward the stack by spring-biased plunger 42. The lever functions to hold an individual retainer in the lugs-down position in the path of the injector plate 26 centrally between guide rails 22b. Thus, as the injector plate 26 descends, it will shear an individual retainer ring from the stack 36 for injection into the ring compressing means 49 therebelow through access slot 45 therein which is in vertical alignment with guide slots 25 and the injector plate 26 as best seen in FIGS 1, 2 and 7. Of course, it is apparent that the stack 36 of retainer rings can be supplied onto feed rail 34 manually or by suitable rail loading means within the skill of the art.

As shown most clearly in FIGS. 1 and 5-8, the ring compressing means 10 is mounted below the loading means 12 to receive an individual retainer ring sheared from the stack 36 by the injector plate 26 during its downward movement. The ring compressing means includes a base member 60 on which are mounted a barrel assembly 62, mandrel 64, plunger tube 66, and hydraulic cylinder 68.

Figure 5:
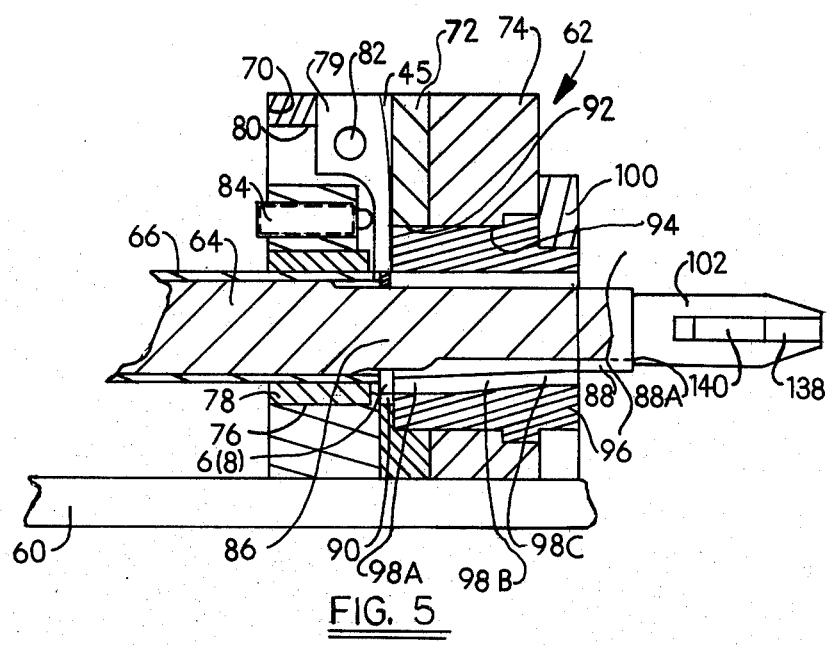
FIG. 5 is a sectional view of the ring compression assembly with the mandrel.
Figure 6:
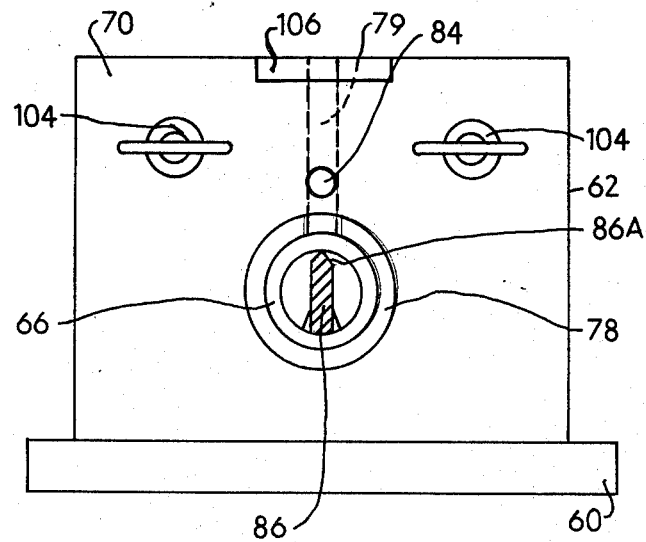
FIG. 6 is an end elevation of the ring compression assembly (inlet end).

Referring primarily of FIGS. 5 and 6, the barrel assembly 62 comprises a plurality of support bodies including first end body 70, an intermediate body 72 and a second end body 74. First end body includes a central aperture 76 which a bushing 78 is received. The first end body 70 and intermediate body 72 are configured to define access slot 45 when the bodies are mated for entry of an individual retainer ring being injected by injector plate 26. A guide lever 79 is mounted in a cavity 80 in the first end body 70 by means of a pivot shaft 82 and is biased by spring loaded plunger 84 toward the intermediate body 72 into U-shaped access slot 45 to engage a retainer ring and maintain the lugs 6,8 thereof in the downward position so that the spaced apart lugs pass over the mandrel 64, in particular over the reduced end 86 which is generally rectangular in cross-section with a tapered top 86a over which the lugs slide. The tapered, reduced mandrel end 86 functions as a guide portion of the mandrel in front of the compression barrel member 96 to align the retainer ring lugs 6,8 in the down position with respect to the mandrel lug-engaging means shown as an elongated keyway or slot 88 therein. The intermediate body 72 further includes a stop surface 90 aligned beneath access slot 45 and against which the retainer ring abuts when injected fully onto the reduced mandrel end 86 by the injector plate, FIG. 5.

It is apparent that the intermediate body 72 and second end body 74 have coaxially aligned central apertures 92 and 94 which receive and locate a compression barrel member 96. The barrel member 96 includes a bore 98 therethrough with a first cylindrical inlet section 98a of a sufficient diameter to receive the uncompressed retainer ring, and intermediate tapered section 98b having a gradually decreasing diameter toward the end plate 100 and a second cylindrical outlet section 98c with a smaller diameter corresponding to the outlet diameter of the intermediate section 98b. The keyway 88 of the mandrel 64 is tapered gradually to open along the length thereof disposed in the first bore section 98a and sharply opens to full depth along the length thereof disposed in the tapered bore section 98b. The keyway 88 as shown extends through bore sections 98b and 98c out of the barrel assembly and terminates at the junction with the mandrel alignment nose 102, the end 88a of the keyway constituting an expansion portion of the mandrel to be described in more detail hereinbelow.

As shown, the support bodies 70,72,74 are initially aligned together by a pair of alignment pins 104 extending through suitable passages in the bodies. The bodies are of course securely fastened to base 60 by bolts (some of which are shown in FIG. 7) or other appropriate means. A horizontally extending support plate 106 is attached to first end body 70 and provides support to the feed rail 34 as shown in FIG. 1.

The mandrel 64 is supported inside the compression barrel member 96 and cylindrical plunger tube 66 by means of a pair of mandrel side supports 108 and two pairs of lateral bolts 110 extending from the supports 108 into the mandrel 64 through elongate slots 112 on each side of the plunger tube. The supports 108 are attached to the base 60 by bolts or other suitable means.

As noted previously, a bushing 78 is seated in the first end member 70. A second bushing 114 is also seated in tube support 116 to support the other end of the plunger tube for sliding movement through bore 98 of the barrel assembly to the assembly location as will be explained. A hydraulic cylinder 68 is also mounted on base 60 and is connected to the solid end of plunger tube 66 by means of coupling 118. The cylinder slides the plunger toward or away from the barrel assembly.

In operation, an individual retainer ring is sheared from the ring stack 36 by downward movement of injector plate 26 which pushes the ring through access slot 45 in the barrel assembly and onto the reduced end 86 of the mandrel 64 in front of compression member 96 with the retainer ring lugs oriented down, FIG. 5. The plunger tube 66 is then moved to the right in FIG. 5 by cylinder 68 so as to engage the retainer ring positioned on reduced mandrel end 86 and push it through the compression barrel member 96 during which the ring is gradually compressed in size in tapered bore section 98b and fully compressed to assembly size with the lugs 6,8 being compressed into and retained in keyway 88 with the lug portions 6a,8a touching during passage of the ring through bore section 98c. The ring is thus compressed to assembly size on the mandrel 64 which has a diameter selected to this end and retained thereon by the lugs being retained in the keyway 88 as shown in FIG. 10. The ring is pushed along the mandrel 64 through bore 98 and out the other side of the barrel assembly to the mandrel nose 102 where the compressed-to-size retainer ring is stripped by the plunger tube moving the ring past the keyway end 88a to the reduced cross-section nose where the ring expands in size.

FIG. 12 shows how essentially automatic assembly of the compressed ring into a diesel piston 131 is effected in a preferred apparatus. As shown, the base 60 is provided with an assembly table 120 and stops 122 on which the piston 131 is positioned in a head-down orientation, as shown, with the mandrel nose 102 inserted and aligned in the bore 132 of the wrist pin 134 already mounted in the piston along with the connecting rod 136. The mandrel nose 102 includes tapered pilot ribs 138 and full ribs 140 providing the proper alignment diameter. It is apparent that the diameter of the plunger tube 66 is selected to mate closely with the pilot bore 142 of the diesel piston 131 and that the length of the mandrel 64 is selected to effect termination of the lug-retaining keyway 88 at end 88a immediately adjacent the enlarged ring-receiving groove 144 of the piston. When the plunger tube 66 pushes the compressed retainer 2 ring past the end of the keyway 88, the retainer ring will expand into the groove 144 completing assembly of that side of the wrist pin in the piston. Preferably, an identical apparatus as that described hereinabove is positioned on the other side of the piston and simultaneously inserts the other retainer ring in ring-receiving groove 146 through pilot bore 147, completing assembly of the piston, wrist pin and connecting rod with the pair of retainer rings.

While there have been described what are considered to be certain preferred embodiments of the invention, other modifications, additions, and the like will occur to those skilled in the art and it is intended to cover in the appended claims all such modifications as fall within the true spirit and scope of the invention.

I claim:

1. An apparatus for compressing and holding a retainer ring having spaced apart lugs at reduced assembly size, comprising a compressing means for compressing the retainer ring exteriorly thereof and mandrel means disposed in the compressing means and around which the retainer ring is compressed to assembly size, said mandrel means having lug-retaining groove means including opposing spaced apart sides to receive and retain the retainer ring lugs therebetween and into which the retainer ring lugs are compressed and retained interiorly of the ring to hold the ring at compressed assembly size on said mandrel means, said mandrel means including a portion extending from the compressing means to an assembly location and wherein the apparatus further comprises means for moving the compressed retainer ring to the assembly location on said mandrel means, the ring being maintained at the compressed assembly size on said mandrel means by the lugs being retained in said lug-retaining means without the need for external ring containment.

2. The apparatus of claim 1 wherein the lug-retaining means of said mandrel means terminates adjacent the assembly location so that the ring is freed to expand by said ring moving means moving the compressed assembly size ring to the assembly location past the termination of said lug-retaining means.

3. An apparatus for compressing and holding a retainer ring having spaced apart lugs at reduced assembly size, comprising a compressing means having a bore of decreasing cross-section adapted to receive the retainer ring with the bore having an inlet end and outlet end, mandrel means disposed in said bore and extending from the inlet end past the outlet end and around which the retainer ring is compressed during movement through said bore, said mandrel means having lug-retaining groove means configured to receive and interiorly retain the retainer ring lugs therein and into which the lugs are compressed and retained internally of the ring as the ring moves through said bore, and means for moving the ring through the bore on said mandrel means in the direction of decreasing bore cross-section, whereby the retainer ring is compressed to assembly size on said mandrel means and is held at that size on the mandrel means past said outlet end by the lugs thereof being retained in said lug-retaining groove means without the need for external ring containment.

4. The apparatus of claim 3 wherein the bore of said compressing means is inwardly tapered in the direction of ring movement therethrough.

5. The apparatus of claim 3 wherein said mandrel means includes a guide portion adjacent one end before the compressing means for aligning the uncompressed retainer ring lugs in desired relation to said lug-retaining groove means, an intermediate portion having said lug-retaining groove means, and an expansion portion adjacent the other end outside the compressing means where said lug-retaining groove means terminates to allow the compressed ring to expand.

6. The apparatus of claim 5 wherein the intermediate portion of said mandrel means extends from inside said bore to outside said bore and terminates adjacent the expansion portion of said mandrel means at an assembly location.

7. The apparatus of claim 5 wherein the lug-retaining means comprises a keyway extending along the intermediate portion of said mandrel means to said expansion portion.

8. The apparatus of claim 5 wherein access means is provided to the compressing means adjacent one side of the guide portion of said mandrel means and wherein loading means is provided for feeding an individual retainer ring through said access means onto the guide portion in a straddling fashion with the lugs being aligned by said guide portion in proper relation to said lug-retaining means.

9. The apparatus of claim 8 wherein the loading means comprises a feed rail means for carrying a plurality of retainer rings in a stack, injector means for separating an individual retainer ring from the stack and conveying it to said access means, and guide means extending to said access means for guiding the individual retainer ring onto the guide portion of said mandrel in said bore as it is conveyed by said injector means.

10. The apparatus of claim 5 wherein said ring moving means comprises a tubular pusher member for engaging the retainer ring at the guide portion, moving it through said bore along said intermediate portion and out of said bore to said expansion position where the ring is free to expand.

11. An apparatus for compressing a retainer ring having spaced apart lugs to reduced assembly size and providing the compressed ring to an assembly location, comprising a compressing means having a bore with an inlet portion for receiving the retainer ring, an intermediate portion having a decreasing crossing-section and an outlet portion through which the compressed ring exits the compressing means, mandrel means disposed in said bore and having a guide portion located adjacent the inlet portion of said bore, an intermediate portion with lug-retaining groove means configured to receive and interiorly retain the retainer ring lugs therein and located within the intermediate and outlet portions of said bore and extending out of said bore to the assembly location where said lug-retaining groove means terminates and an expansion portion adjacent the assembly location, a tubular pusher member extending into the inlet portion of said bore for engaging the retainer ring on the guide portion of said mandrel means and moving the ring through said bore on said mandrel to the assembly location whereby the ring is compressed to assembly size in the intermediate portion of said bore, retained interiorly of the ring at assembly size during movement to the assembly location outside said bore by the lugs being retained in said lug-retaining groove means and allowed to expand at the assembly location where the lug-retaining groove means terminates, and further comprising means for moving said pusher member through said bore toward the assembly location.

12. The apparatus of claim 11 which further includes loading means for feeding the retainer ring adjacent the inlet portion of said bore and onto the guide portion of said mandrel means, said loading means including a feed rail means for carrying a plurality of retainer rings in a stack, injector means for separating an individual ring from the stack and conveying it to the inlet portion and guide means extending to the inlet portion for guiding the retaining ring onto the guide portion of said mandrel means as it is conveyed by said injector means.

13. The apparatus of claim 12 wherein said injector means comprises an injector plate mounted for reciprocation toward and away from the inlet portion and said guide means comprises a guide slot in communication with the inlet portion and a spring-biased guide lever to guide the ring through the guide slot onto the guide portion of the mandrel means.

14. The apparatus of claim 11 wherein the bore inlet portion is circular in cross-section having a first diameter to receive the uncompressed ring, the bore outlet portion is circular in cross-section having a second diameter smaller than the first diameter to compress the ring and and the intermediate bore portion is circular in cross-section having a diameter gradually decreasing from the first diameter to the second diameter.

15. The apparatus of claim 11 wherein the intermediate portion of said mandrel means is circular in cross-section with the diameter corresponding to the desired assembly size diameter and with a keyway therein constituting the lug-retaining means, the guide portion is a diametrical rib projecting axially from the intermediate portion in a plane corresponding to the plane of the keyway and the expansion portion is a diametrical rib projecting axially from the intermediate portion toward the assembly location in a plane corresponding to the plane of the keyway.

* * * * *